United States Patent [19]

Lewis et al.

[11] 4,313,170

[45] Jan. 26, 1982

[54] AUTOCORRELATION SIDE LOBE REDUCTION DEVICE FOR PHASE-CODED SIGNALS

[75] Inventors: Bernard L. Lewis, Oxon Hill; Frank F. Kretschmer, Laurel, both of Md.

[73] Assignee: The United States of America as represented by the Secretary of the Navy, Washington, D.C.

[21] Appl. No.: 162,346

[22] Filed: Jun. 23, 1980

[51] Int. Cl.³ .................. G01S 9/233; G06F 15/31
[52] U.S. Cl. .................. 364/517; 343/17.2 PC
[58] Field of Search .............. 364/517, 728, 819, 824; 375/34, 99; 343/17.2 PC; 328/162, 163, 165

[56] References Cited

U.S. PATENT DOCUMENTS

3,747,099 7/1973 Wong ..................... 343/17.2 PC
3,938,153 2/1976 Lewis et al. ................. 364/517 X
3,955,197 5/1976 Gutleber et al. ............ 343/17.2 PC
4,119,963 10/1978 Zwarts et al. .............. 343/17.2 PC
4,156,876 5/1979 Debuisser ................. 343/17.2 PC Primary Examiner—Jerry Smith
Attorney, Agent, or Firm—Robert F. Beers; William T. Ellis; Alan P. Klein

[57] ABSTRACT

A pulse compression decoder which oversamples by two the signal elements of a received phase-coded signal, performs a pairwise average on the signal elements at intervals equal to ½ the width of a signal element, reverse-codes the pairwise averages, combines the pairwise averages to form a sub-accumulation signal, and performs a pairwise average on the sub-accumulation signals at intervals equal to ½ the width of a signal element to produce a compressed pulse having a high peak-to-side lobe ratio.

9 Claims, 13 Drawing Figures

AUTOCORRELATION SIDE LOBE REDUCTION DEVICE FOR PHASE-CODED SIGNALS

BACKGROUND OF THE INVENTION

This invention relates generally to pulse compression systems, and more particularly to means for reducing the range side lobes of the compressed pulse produced in such systems.

It is previously known to transmit pulses from a radar equipment which consist of a carrier modulated according to a certain code pattern. In the radar receiver, a matched filter is provided by means of which a correlation between the incoming radar pulse and the known pattern is carried out. As a result, there is obtained a signal with a well-defined autocorrelation peak surrounded by a number of range side lobes. An example of such a known method to transmit and detect phase-coded radar pulses is described in the U.S. Pat. No. 4,156,876. The above-mentioned method to create a sharp autocrrelation peak in the radar equipment is also known as pulse compression.

The side lobes appearing in the filtered radar pulse are not desirable for the following reason. When the radar is going to detect two different targets A and B, situated at a certain distance from each other, the echo from the target A may interfere with the echo from the target B within a certain mutual distance between the radar targets. This distance is determined by the time interval of the separate radar pulses, and, if the distance is so short that the echo pulse from B appears during the time interval when the echo pulse from the target A appears, interference is obtained. If the target A gives rise to a strong echo while the target B gives rise to a weak echo, the autocorrelation peak in the pulse reflected from B can be completely hidden by the side lobes in the pulse reflected from A. Thus, there is a risk that the target B can not be discovered by the receiver. Therefore, it is important that the side lobes of the reflected pulses be minimized in order to avoid the possibility that the weak target echos will be hidden by the side lobes from an adjacent stronger target echo.

Furthermore, the presence of the range side lobes are disadvantageous as they contribute to the noise level when detecting a target in clutter, that is, unwanted radar echos from ground, sea, rain, etc.

Old methods and apparatus produce autocorrelation function peak-to-maximum side lobe levels less than or equal to 10 times the time-bandwidth product of the signal for large time-bandwidth products unless amplitude weighting is employed. Such weighting, however, reduces the output signal-to-noise ratio. A typical example is a Frank Code compressor as discussed in Cook and Bernfeld, "Radar Signals," 1967, Academic Press. These peak-to-side lobe ratios are not large enough to meet the needs of radars that must range resolve targets whose magnitudes may differ by many orders of magnitude and which must obtain as high a signal-to-noise ratio as possible.

SUMMARY OF THE INVENTION

Accordingly, it is an object of the present invention to increase the peak-to-side lobe ratio of a compressed pulse produced in a pulse compression system.

Another object is to increase the time resolution in pulse compression systems by reducing the amplitude of the range side lobes relative to that of the autocorrelation peak.

The objects of the present invention are achieved by a decoder which decodes groups of $N^2$ sequentially applied signal elements that have been reflected from a reflector element after being encoded by a polyphase function. N is an integer. Each group differs from the preceding group by the addition of a new signal element to one end of the group and the deletion of a signal element from the other end of the group. In the decoder, an oversample-averaging circuit adds each of the signal elements of each group to itself at a first time instant to form a first averaged signal of $N^2$ elements and to the corresponding signal elements of a next applied group at another time instant to form a second averaged signal of $N^2$ elements. A multiplier circuit impresses phase rotations on the $N^2$ signal elements of each averaged signal equal in magnitude but opposite in direction to the phase rotations impressed on the transmitted signal. A summing circuit adds together the phase-rotated signal elements of each averaged signal to form a sub-accumulation signal. Finally, an averaging window circuit adds each sub-accumulation signal to a next generated sub-accumulation signal. The output of the decoder is a compressed pulse which exhibits a high peak-to-side lobe ratio.

Additional advantages and features will become apparent as the subject invention becomes better understood by reference to the following detailed description when considered in conjunction with the accompanying drawings wherein:

DESCRIPTION OF THE PREFERRED EMBODIMENT

The subject invention may be better understood by first discussing polyphase code techniques and a pulse compression application requiring the decoding of consecutive groups of encoded signals.

Figure 1:
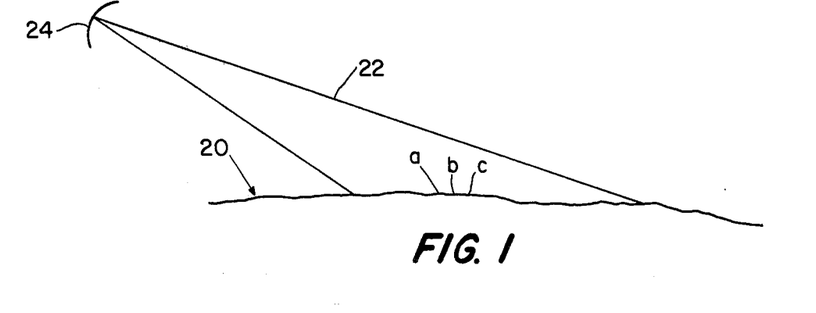
FIG. 1 depicts a group of discrete closely spaced reflectors within the radiation beam of a radar transmission system and is useful in the explanation of the operation of the invention.
Figure 2:
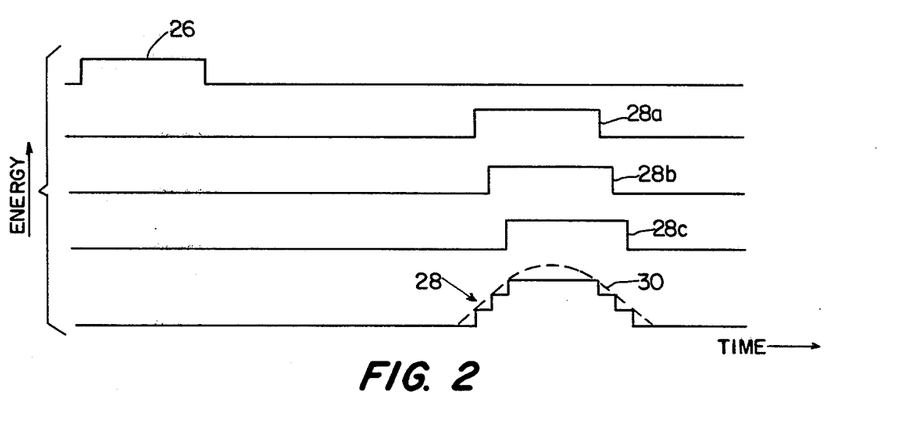
FIG. 2 shows waveforms of a transmitted signal pulse, received signals from each of the reflectors of FIG. 1, and a composite signal received from the three reflectors.

FIG. 1 shows in greatly simplified terms one such application wherein the terrain 20 includes closely spaced reflector elements a, b and c within the pattern 22 of an antenna 24. If it is assumed that the transmitted energy pulse is as shown by a waveform 26 in FIG. 2, waveforms 28a, 28b and 28c of FIG. 2 show the return signals from the reflectors of FIG. 1 designated by the same letter; and waveform 28 the composite received video signal. Dashed line 30 depicts the shape of signal 28 after processing by a receiver of limited bandwidth and as may be seen from envelope 30 the range and number of the individual reflectors could not be determined simply from the amplitude of the composite signal 28.

Figure 3:
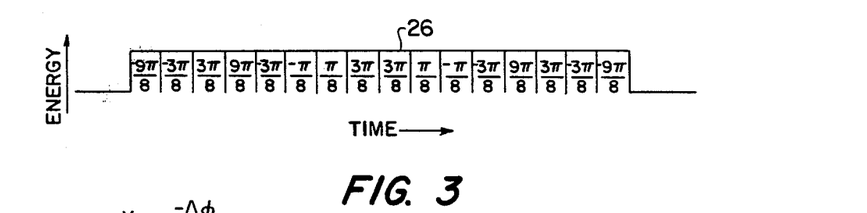
FIG. 3 depicts the relative phase shift within a transmitted pulse for a simplified code of four encoded states and 16 elements.

If the transmitted pulse 26 were first phase-encoded with a suitable code, range resolution could be greatly enhanced and by way of example the transmitted pulse 26 is shown at an expanded time scale in FIG. 3 as encoded by a novel polyphase code having 16 phase states and 16 encoded elements. This code will be discussed in greater detail hereinafter. The phase (in radians) encoded on each of the signal elements within pulse 26 is indicated in the FIG. 3 and may be determined from the matrix of Table 1 as read from left to right progressing from the top to the bottom row.

TABLE I

| | Code Element (p) | | | | |
|---|---|---|---|---|---|
| | 0 | 1 | 2 | 3 | |
| 0 | $\frac{-9\pi}{8}$ | $\frac{-3\pi}{8}$ | $\frac{3\pi}{8}$ | $\frac{9\pi}{8}$ | |
| 1 | $\frac{-3\pi}{8}$ | $\frac{-\pi}{8}$ | $\frac{\pi}{8}$ | $\frac{3\pi}{8}$ | Code Subgroup (K) |
| 2 | $\frac{3\pi}{8}$ | $\frac{\pi}{8}$ | $\frac{-\pi}{8}$ | $\frac{-3\pi}{8}$ | |
| 3 | $\frac{9\pi}{8}$ | $\frac{3\pi}{8}$ | $\frac{-3\pi}{8}$ | $\frac{-9\pi}{8}$ | |

Figure 4:
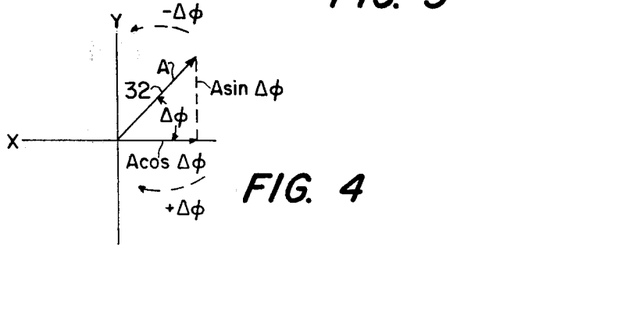
FIG. 4 is a vector diagram for explaining the vectorial symbology adapted herein.

Before further proceeding with the explanation of the pulse compression application, the vector symbology adapted herein will first be explained with reference to FIG. 4. The relative phase of the transmitted energy contained within pulse 26 may be represented by vector 32 of length A referenced to an XY coordinate system. The coordinate system (X,Y) is assumed to rotate at an angular frequency $f_o$, equal to the fundamental frequency of the transmitted pulse.

A phase shift $\Delta\phi$ in the transmitted signal relative to the fundamental frequency $f_o$ is shown by the angle between the X axis and the vector; and the vector may be defined by the magnitude of the vector sum of the inphase component along the X axis ($A \cos \Delta\phi$) and the imaginary component ($A \sin \Delta\phi$) along the Y axis. Sometimes hereinafter such a vector is designated by the notation $A \cos \Delta\phi + j A \sin \Delta\phi$. As indicated in FIG. 4, a clockwise phase rotation has arbitrarily been assigned a positive value while a counterclockwise rotation (phase delay) is designated a negative value. A phase advance of X degrees may be mechanized by phase delay of $2\pi - X$ degrees.

To properly decode a transmitted pulse such as pulse 26 (FIG. 3) a phase rotation equal to but opposite to the phase encoded during transmission is impressed on the received signal (multiplication by the complex conjugate of the encoded value, i.e., multiplication by the complex quantity $(\cos \Delta\phi - j \sin \Delta\phi)$. For example, in complex notation, a phase shift of 45° C. may be mechanized by a multiplication by the complex quantity $(1+j)/\sqrt{2}$. To decode a signal element which had been encoded by the just mentioned 45° C. phase shift would require multiplication by the complex conjugate of the encoding function, i.e., $(1-j)/\sqrt{2}$. If the received signal 28 were applied to a shift register such that all the signal elements of the signal reflected from one of the reflectors, such as the reflector b for example, were contained within the shift register, then the range interval corresponding to the area containing the reflector b could be examined by providing the appropriate decoding phase shift.

Figure 5A:
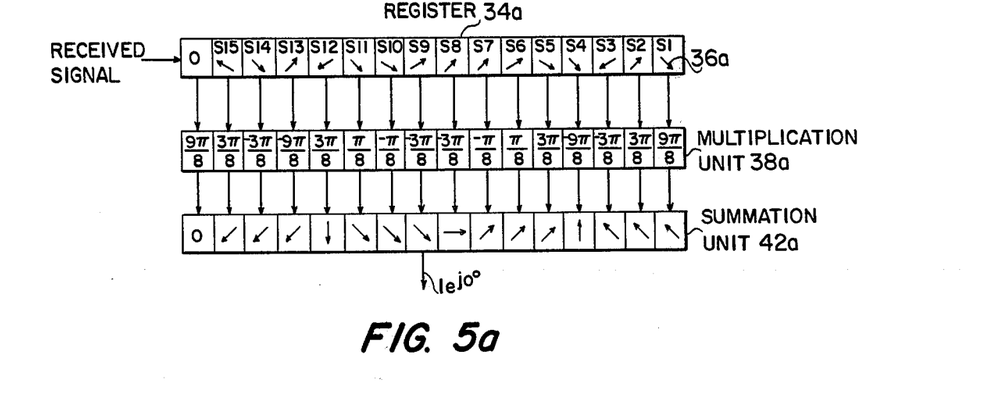
FIGS. 5a, 5b, and 5c illustrate simplified decoding sequence for the signals from each of the reflectors of FIG. 1 for the purpose of assisting in the visualization of the pulse compression effect derived from polyphase encoded signals.
Figure 5B:
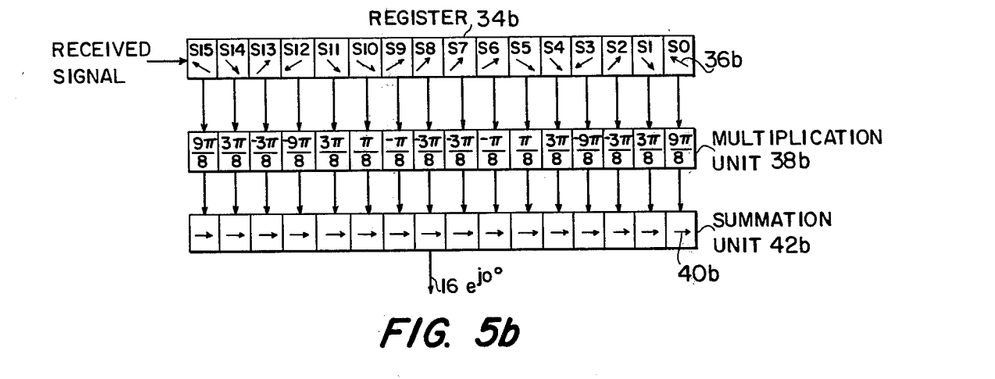
Figure 5C:
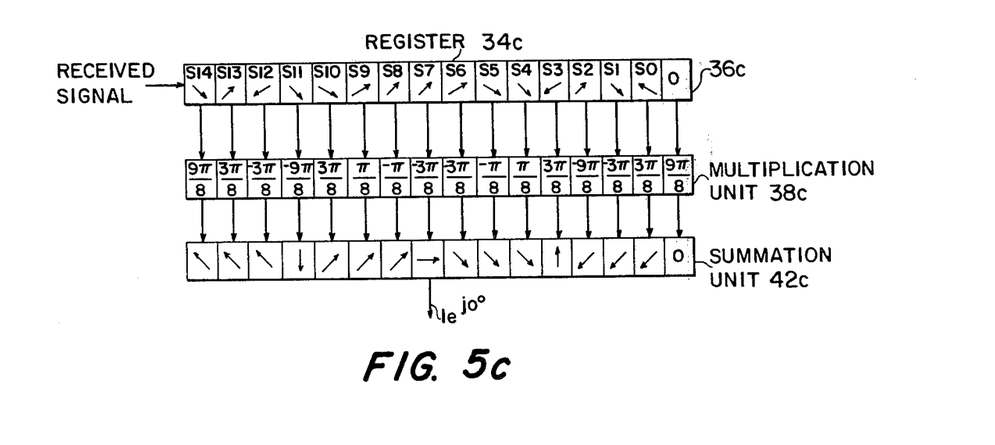

The prior-art decoding process may be visualized by referring to FIGS. 5a, 5b and 5c wherein each of the returned signals 28a, 28b and 28c respectively are decoded as though they were separately processed. If it is assumed that the signals are processed in a linear manner prior to the decoding step, an analysis of each signal separately and a combination of results thereof is indicative of the results of the simultaneous processing of the signals (Superposition Theorem). It is assumed that the signal elements of the received signal 28 are shifted into 16 stage registers 34a, 34b and 34c so that the signal elements associated with each reflector are stored within the correspondingly labeled register. If it is further assumed that at the time of a particular observation the last return element from reflector b had been just received, it may be shown that by proper decoding the received energy from reflector b is enhanced while the energy from reflectors a and c is attenuated. In FIGS. 5a-5c the received signal components are illustrated as being separately processed in registers 34a-34c, multiplication units 38a-38c and summers 42a-42c corresponding to the component signal from the respective reflector designated by the same letter—it being understood that in actuality one unit simultaneously processes the composite signal 28.

The signal elements $S_0$ through $S_{15}$ associated with reflector b are shown in FIG. 5b as being stored in the register 34b. The relative phase of each received signal element is indicated by vector arrows such as arrow 36b. To decode the signal group contained in the register 34b, a phase rotation equal in magnitude but opposite in direction so that impressed upon the transmitted signal is required. This phase rotation may be produced in a complex multiplication unit 38b which produces the phase shift indicated therein which is opposite to the phase shift impressed on transmitted signal 26.

The output of the multiplication unit 38b (phase indicated by arrows such as 40b) is applied to a complex summation unit 42b and the sum produced by this unit is indicated at the output thereof as a vector with an amplitude 16 times that of each element of the signal 28b and at a relative phase angle of zero ($16e^{j0}$).

It will be noted in FIGS. 5a, 5b and 5c that each element of the same stage (rank) of shift register 34 receives the same phase rotation in the multiplier units 38a-38c. However, the signals associated with reflectors a and c are at a different relative position in the registers and are decorrelated whereas the signals from the reflector b are centered in the register and are correlated. In regard to this last point, it will be noted that in register 34a the signal element $S_0$ (the first return from reflector a at a time t=0) has been shifted out of the register and the entire code is one position to the right of the corresponding elements in register 34b with no energy in position 16, in register 34a. Similarly the code elements in the register 34c are each shifted one position to the left of the elements of the register 34b. As indicated by the sum values at the outputs of the summation networks 42, the reflected energy from the range interval being correlated (reflector b) is enhanced and the energy value from the adjacent uncorrelated range intervals (a and c) are substantially attenuated.

Figure 6:
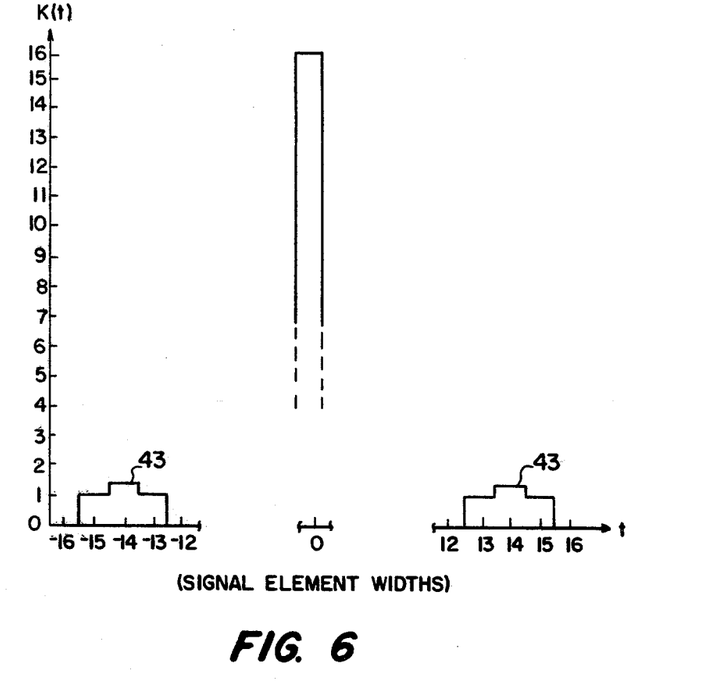
FIG. 6 is a fragmentary diagram of the output of summation unit 42b of FIG. 5b.

Considering again the processing described relative to FIG. 5b, let the time of observation be defined as $t=0$ when the encoded signal elements from reflector b are centered in register 34b and are correlated. As the time of observation is varied about $t=0$ within a period twice the width of waveform 26, the output of summation unit 42b the width of waveform 26, the output of summation unit 42b is obtained as a signal k (t) with a well-defined autocorrelation peak at $t=0$ surrounded by a number of range side lobes 43. FIG. 6 is a fragmentary diagram of the signal k(t). The range side lobes are caused by fluctuations in the decorrelation (phase cancellation) as the encoded signal elements from reflector b are shifted to the extreme positions of register 34b and the number of signal elements in the register decreases. Near the ends of the observation period, decorrelation is least and significant side lobe energy is produced. A figure of merit of the compressed pulse signal at the output of register 34b is defined by the amplitude ratio between the desired peak at $t=0$ and the range side lobes occuring at the ends of the observation period. The greater the ratio, the less ambiguity in determining the range of reflector b when other reflectors are located in the same vicinity.

A preferred embodiment of a decoder in accordance with the subject invention which exhibits the advantage of a high amplitude ratio between the desired peak at $t=0$ and the range side lobes occuring at the ends of the observation period will now be described.

The decoder decodes sequences or groups of signal elements reflected from a reflector element such as reflector b in FIG. 1 and which have previously been encoded by a polyphase function. Each group of decoded signal elements is of length $N^2$, ($N=4$ in the illustrated embodiment). For the case of $N=4$, an exemplary code matrix of the encoded phasors (phase rotation impressed on the transmitted signal) is given in Table I and the corresponding signal matrix is given in Table II for the group of signal elements encoded at the time arbitrarily designated $t=0$.

TABLE II

| Signal Matrix at t = 0 | | | |
|---|---|---|---|
| $S_0$ | $S_1$ | $S_2$ | $S_3$ |
| $S_4$ | $S_5$ | $S_6$ | $S_7$ |
| $S_8$ | $S_9$ | $S_{10}$ | $S_{11}$ |
| $S_{12}$ | $S_{13}$ | $S_{14}$ | $S_{15}$ |

The signal elements for the next subsequent group of signal elements to be decoded at the time period $t=1$ are specified in Table III.

TABLE III

| $S_1$ | $S_2$ | $S_3$ | $S_4$ |
|---|---|---|---|
| $S_5$ | $S_6$ | $S_7$ | $S_8$ |
| $S_9$ | $S_{10}$ | $S_{11}$ | $S_{12}$ |
| $S_{13}$ | $S_{14}$ | $S_{15}$ | 0 |

It will be noted from Tables II and III that the difference between groups of subsequent signal elements decoded at the time $t=0$ and $t-1$ is the deletion of the signal element designated $S_0$ and the addition of the signal element 0.

Figure 7A:
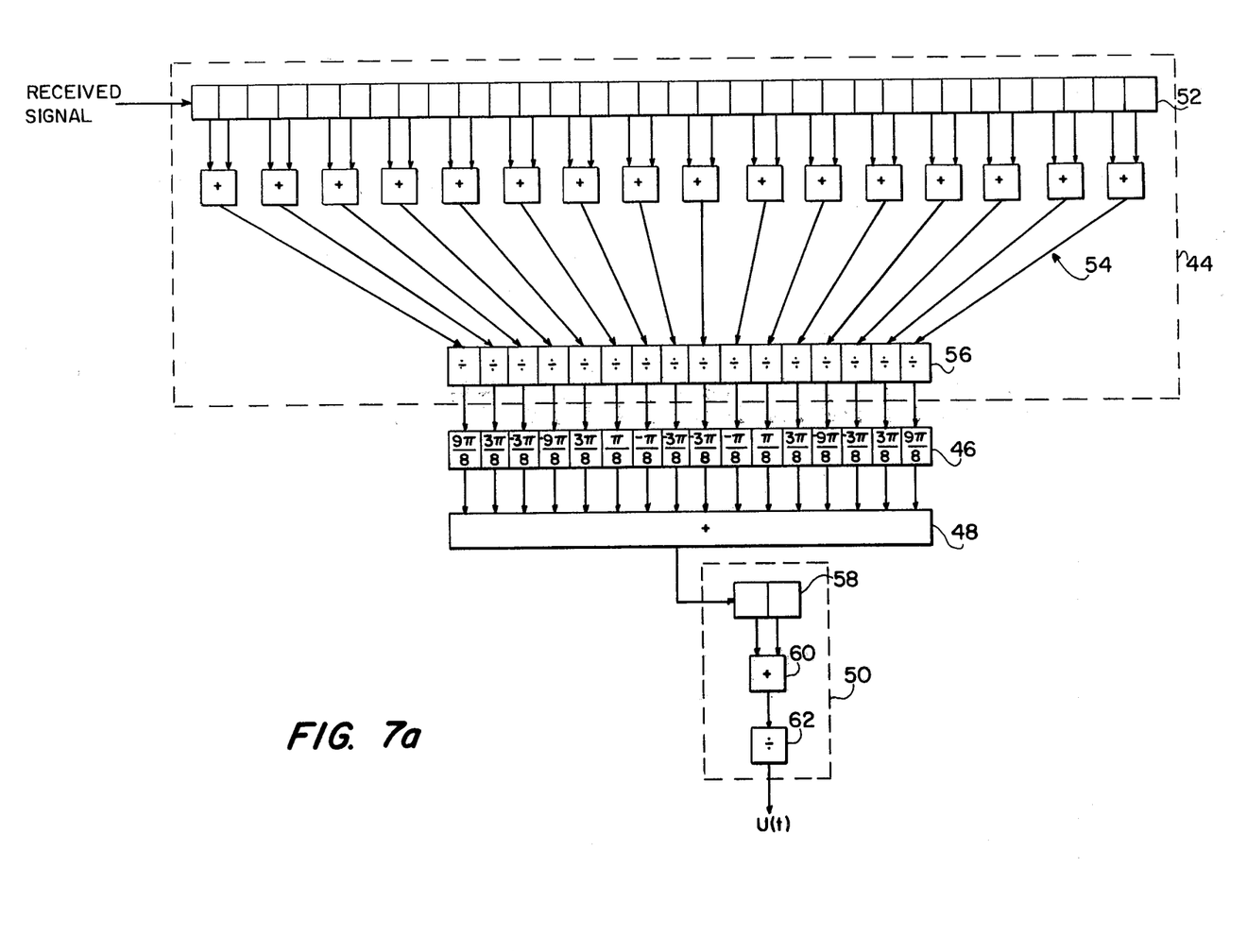
FIGS. 7a, 7b, 7c and 7d comprise a block diagram of a preferred embodiment of the decoder in accordance with the invention and a decoding sequence for the signals from reflector b of FIG. 1.

Referring to FIG. 7a which illustrates a preferred embodiment of the decoder, the decoding function is mechanized by:

(1) oversample-averaging means 44 which adds each of the signal elements of each group to itself at one instant of time to form a first averaged signal having $N^2$ signal elements, and to the corresponding signal elements of the next applied group at another instant of time to form a second averaged signal having $N^2$ signal elements;

(2) multiplier means 46 which impresses phase rotations of the $N^2$ signal elements of each averaged signal which are equal in magnitude but opposite in direction to the phase rotations impressed on the transmitted signal;

(3) summing means 48 which adds together the phase-rotated signal elements of each averaged signal to form a sub-accumulation signal; and (4) averaging window means 50 which adds each sub-accumulation signal to the next generated sub-accumulation signal to produce a decoded output u(t).

While the oversample-averaging means 44 may take a variety of forms, conveniently it may take the form illustrated in FIG. 7a of a delay means 52 having 2 $N^2$ distributed outputs ($N=4$ in the illustrated embodiment) which produces a uniform delay between adjacent ones of successive outputs equal to $\frac{1}{2}$ the width of a signal element; a signal-combining means 54 coupled to the delay means which combines signals from successive pairs of outputs of the delay means; and dividing means 56 coupled to the signal-combining means which halves the combined signals. Delay means 52 may comprise, for example, 2 $N^2$ stages of a dual-channel shift register having one channel for processing the inphase component of the signal elements, A cos $\Delta\phi$, and another channel for processing the quadrature component of the signal elements, A sin $\Delta\phi$, in a manner known to those skilled in the radar art. The shift register has one output terminal at every stage with a uniform delay between stages equal to $\frac{1}{2}$ the width of a signal element so that each received signal element is clocked twice into the register, i.e., is oversampled by 2. Signal-combining means 54 may comprise, for example, $N^2$ dual-channel full adders coupled respectively to successive pairs of output terminals of the 2 $N^2$ stages of the shift register. The full adders alternately add each received signal element to itself or to the next received signal element. Dividing means 56 may comprise, for example, $N^2$ dual-channel dividers coupled respectively to the $N^2$ adders to divide their outputs by 2, so that an average of the oversampled signal elements is obtained.

While a variety of multiplier means 46 may be provided, conveniently it may take the form of $N^2$ complex multipliers coupled respectively to the output of the $N^2$ dividers. In the illustrated embodiment for which $N=4$, the multiplier means includes 16 complex multipliers which produce the phase shift indicated therein which is opposite to the phase shift impressed on the transmitted signal 26 as shown in FIG. 3.

Summing means 48 may comprise, for example, a dual channel full adder coupled to the outputs of the $N^2$ complex multipliers. The full adder adds the phase-shifted outputs of the multipliers at the same time to form a sub-accumulation signal.

While the averaging window means 50 may take a variety of forms, conveniently it may take the form illustrated in the drawing of a delay means 58 having two distributed outputs which produces a uniform delay between the two outputs equal to ½ the width of a signal element; a signal-combining means 60 coupled to the delay means 58 which combines signals from successive pairs of outputs thereof; and a dividing means 62 coupled to the signal-combining means which halves the combined signals. Delay means 58 may comprise, for example, two stages of a dual-channel shift register having an output terminal at each stage with a uniform delay between the stages equal to ½ the width of a signal element so that each sub-accumulation signal is clocked into the register. Signal-combining means 60 may comprise, for example, a dual-channel full adder coupled to the output terminals of the two stages of the shift register. The full adder adds each sub-accumulation signal to the next generated sub-accumulation signal. Dividing means 62 may comprise, for example, a dual-channel divider coupled to the adder. The dividers divides the output of the adder by 2 so that a pairwise average of the sub-accumulation signals is obtained.

Figure 7B:
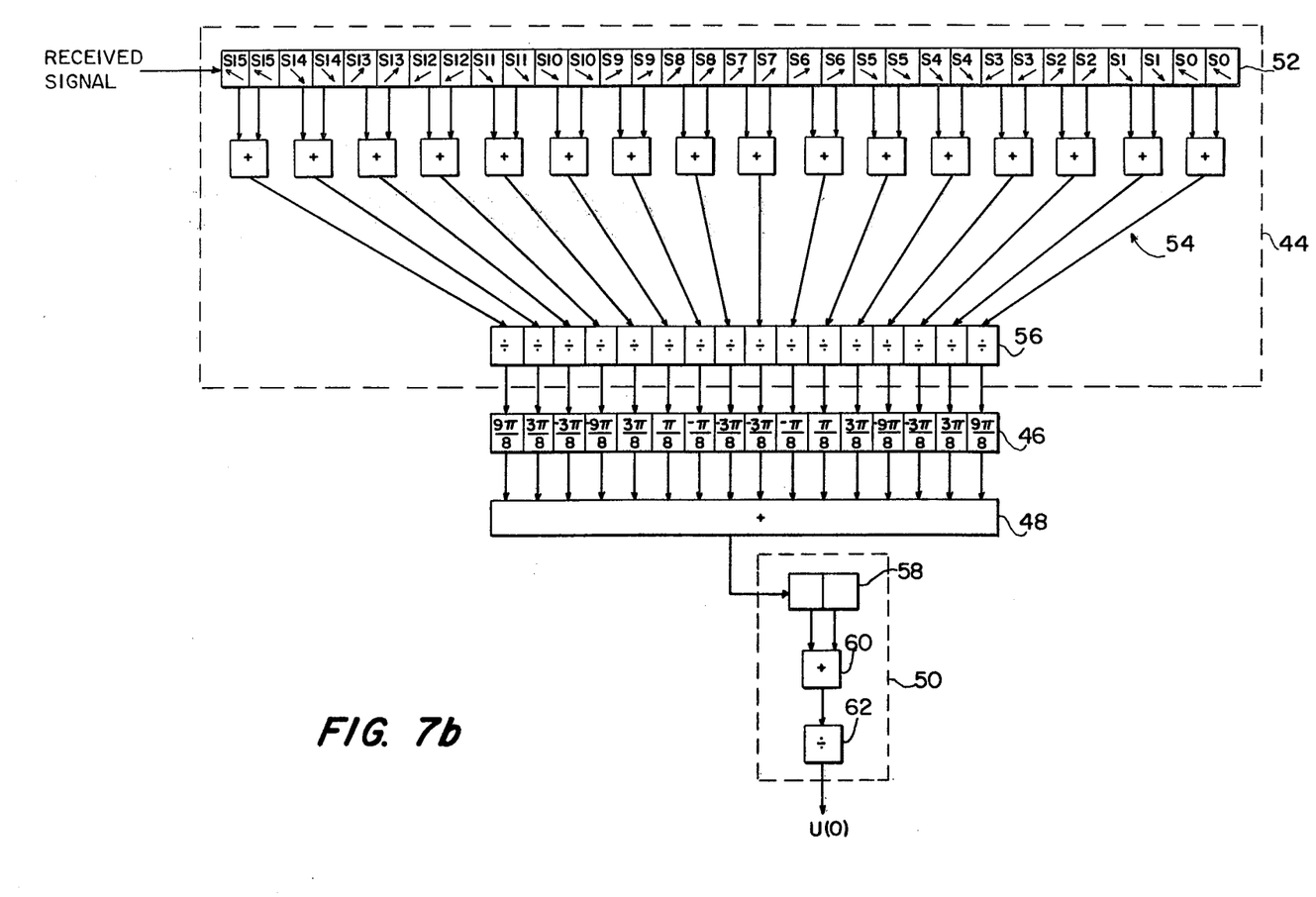
Figure 7C:
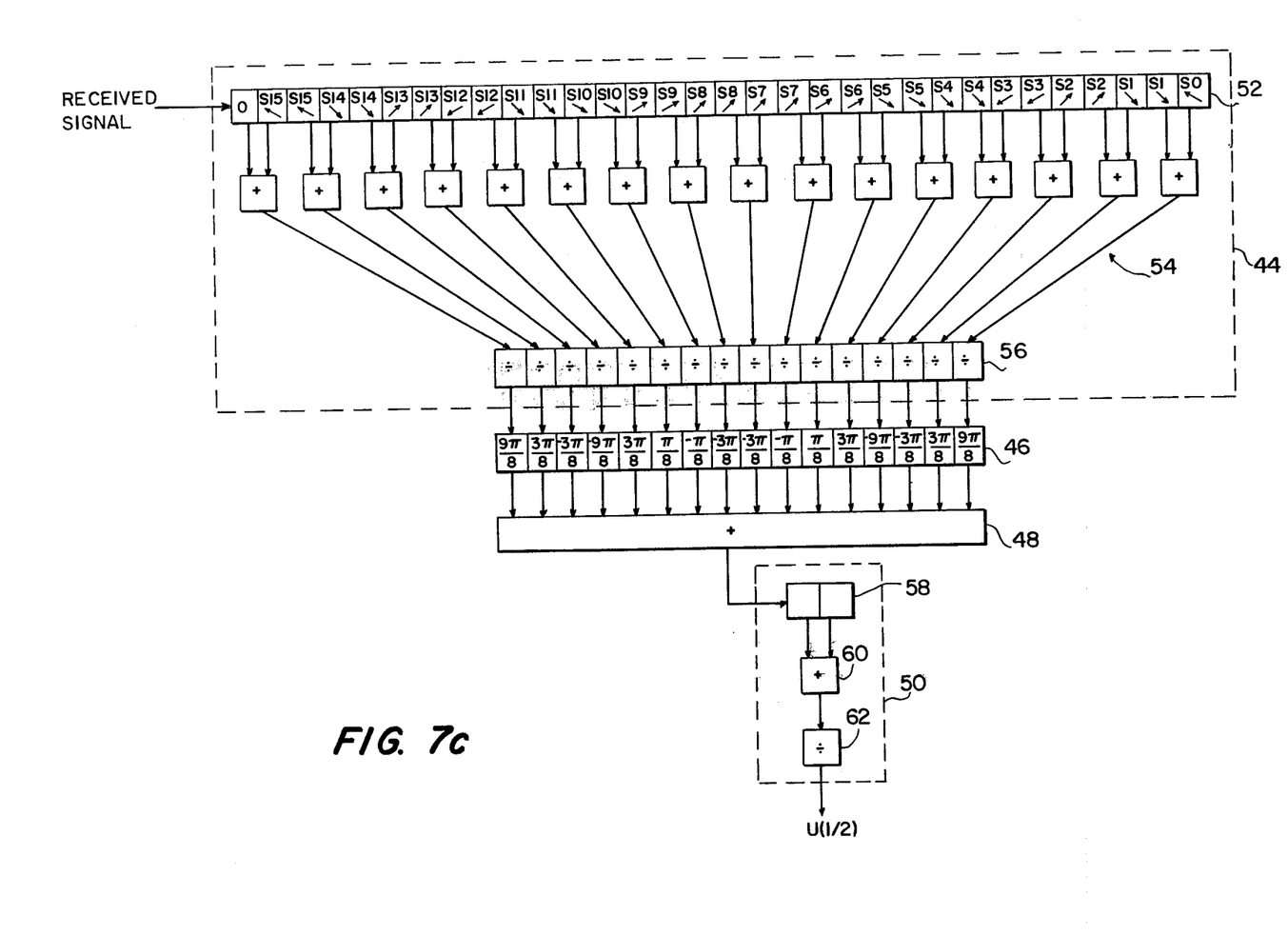
Figure 7D:
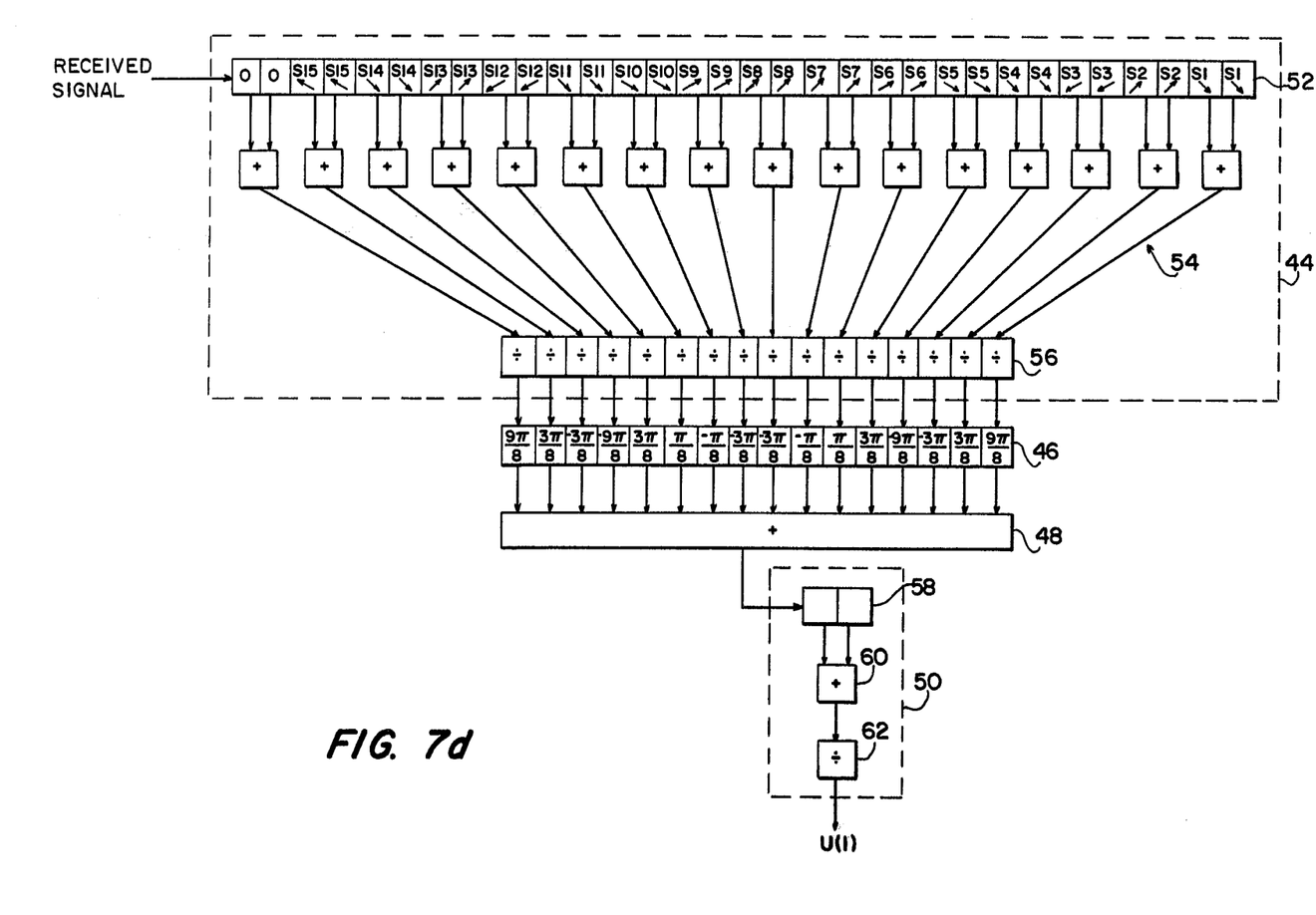

FIGS. 7b, 7c and 7d shows a part of the decoding sequence, the time of observation of FIG. 7b corresponding to t=0, that of FIG. 7c to t=½, and that of FIG. 7d to t=1. In FIG. 7b, at t=0, the signal elements $S_0$ through $S_{15}$ associated with reflector b are shown as being stored in the register 52, with the relative phase of each received signal element being indicated by arrows. In FIG. 7c, at t=½, the signal element $S_0$ (the first return from reflector b at t=16) has been shifted out of the last stage of the register 52 and the entire oversampled code is one position to the right of the corresponding elements in the register 52 of FIG. 7b with a null signal element in the first stage of the register. In FIG. 7d, at t=1, the signal element $S_0$ has been shifted out of the last two stages of the register 52 and the entire oversampled code is two positions to the right of the corresponding elements in the register of FIG. 7b with a null signal element in each of the first and second stages of the register.

Figure 8:
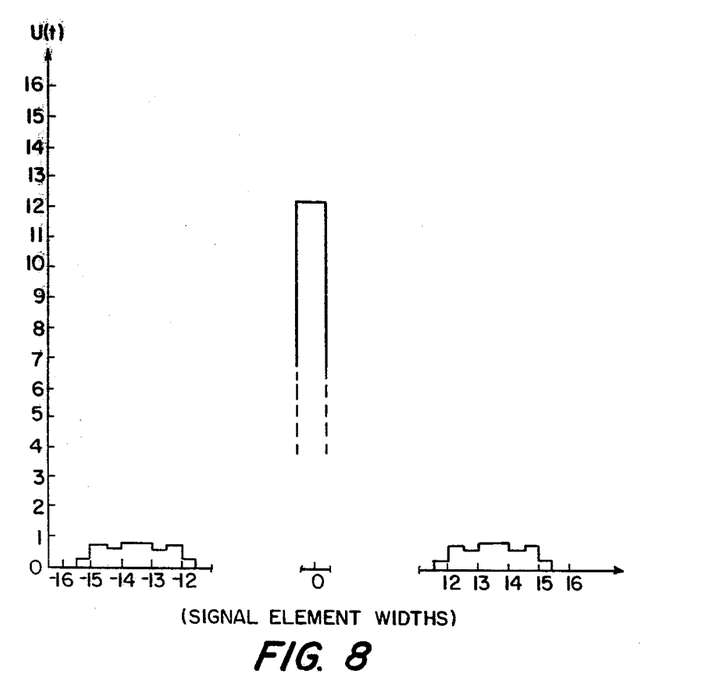
FIG. 8 is a fragmentary diagram of the output of the decoder of FIG. 7.

FIG. 8 shows the waveform u(t) of the output of the decoder when the signal elements of the received signals are passed through it. It will be observed that the desired peak at t=0 and the side lobes at the end of the observation period remain, but the amplitude ratio between then has been increased.

The invention has been illustrated, by way of example, with a code of N=4 which is a species of a novel code type that is suitable for use in the mechanization and method of the subject invention. In general, in the practice of the subject invention, any of the novel code types described by the following formulas can be used (where $\Delta\phi_{k,p}$ is the phase encoded on each of the elements within pulse 26):

$$\Delta\phi_{k,p} = -(2\pi/N)[k-(\tfrac{1}{2})(N-1)][p-(\tfrac{1}{2})(N-1)] \quad (1)$$

k=0, 1, 2, ..., N−1
p=0, 1, 2, ..., N−1 (N an even integer greater than 2).

$$\Delta\phi_{k,p} = -(2\pi/N)k[p-(\tfrac{1}{2})(N-1)] \quad (2)$$

k=0, 1, 2, ..., N−1
k=0, 1, 2, ...,N−1(N an odd integer greater than 3).
The practice of the invention is not limited to these code types and other polyphase codes may be suitable for use therein. For a further discussion of the results achieved by the decoder of FIG. 7, reference may be had to Naval Research Laboratoy Memorandum Report No. 8387, available from NTIS and entitled "A New Class of Pulse Compression Codes and Techniques."

While the invention has been described with reference to a particular transmitting and receiving system, in this case, a radar system, it is noted that the same techniques are available for a variety of other signal processing systems such as sonar, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A decoder for decoding groups of $N^2$ sequentially applied signal elements reflected from a reflector element and which have been previously encoded by a polyphase function, where N is an integer, with each group differing from the preceding group by the addition of a new signal element to one end of the group and the deletion of a signal element from the other end of the group, comprising:

oversample-averaging means for adding each of the signal elements of each group to itself at one instant of time to form a first averaged signal having $N^2$ signal elements and to the corresponding signal elements of a next applied group at another instant of time to form a second averaged signal having $N^2$ signal elements;

multiplier means for impressing phase rotations on the $N^2$ signal elements of each averaged signal equal in magnitude but opposite in direction to the phase rotations impressed on the transmitted signal;

summing means for adding together the phase-rotated signal elements of each averaged signal to form a sub-accumulation signal; and averaging window means for adding each sub-accumulation signal to a next generated sub-accumulation signal to produce a compressed pulse having a high peak-to-side lobe ratio.

2. The decoder recited in claim 1 wherein the oversample-averaging means includes:

delay means having 2 $N^2$ distributed outputs for producing a uniform delay between adjacent ones of successive outputs equal to half the width of a signal element, and signal-combining means coupled to the delay means for combining signals from successive pairs of outputs thereof.

3. The decoder recited in claim 2 wherein the oversample-averaging means includes:

dividing means coupled to the signal-combining means for halving the combined signals.

4. The decoder recited in claim 2 wherein:

the delay means includes 2 $N^2$ stages of a shift register with an output terminal at every stage; and the signal-combining means includes $N^2$ adders coupled respectively to successive pairs of output terminals of the 2 $N^2$ stages of the shift register.

5. The decoder recited in claim 4 wherein the multiplier means includes:

$N^2$ complex multipliers coupled respectively to the $N^2$ adders.

6. The decoder recited in claim 1 wherein the averaging window means includes:

delay means having two distributed outputs for producing a uniform delay between the two outputs equal to half the width of a signal element; and signal combining means coupled to the delay means for combining signals from successive pairs of outputs thereof.

7. The decoder recited in claim 6 wherein the averaging window means includes:

dividing means coupled to the signal combining means for halving the combined signals.

8. The decoder recited in claim 6 wherein:

the delay means includes two stages of a shift register with an output terminal at each stage; and the signal-combining means includes an adder coupled to the output terminals of the two stages of the shift register.

9. A method of decoding groups of $N^2$ sequentially applied signal elements reflected from a reflector element and which have been previously encoded by a polyphase function, where N is an integer, with each group differing from the preceding group by the addition of a new signal element to one end of the group and the deletion of a signal element from the other end of the group, comprising the steps of:

adding each of the signal elements of each group to itself at one instant of time to form a first averaged signal having $N^2$ signal elements and to the corresponding signal elements of the next applied group at another instant of time to form a second averaged signal having $N^2$ signal elements;

impressing phase rotation on the $N^2$ signal elements of each averaged signal equal in magnitude but opposite in direction to the phase rotations impressed on the transmitted signal;

adding together the phase-rotated signal elements of each averaged signal to form a sub-accumulation signal; and adding each sub-accumulation signal to a next generated sub-accumulation signal to produce a compressed pulse having a high peak-to-side lobe ratio.

* * * * *